N. WEISS.
CIGAR PRESS.
APPLICATION FILED SEPT. 1, 1908.
910,977.
Patented Jan. 26, 1909.
3 SHEETS—SHEET 1.
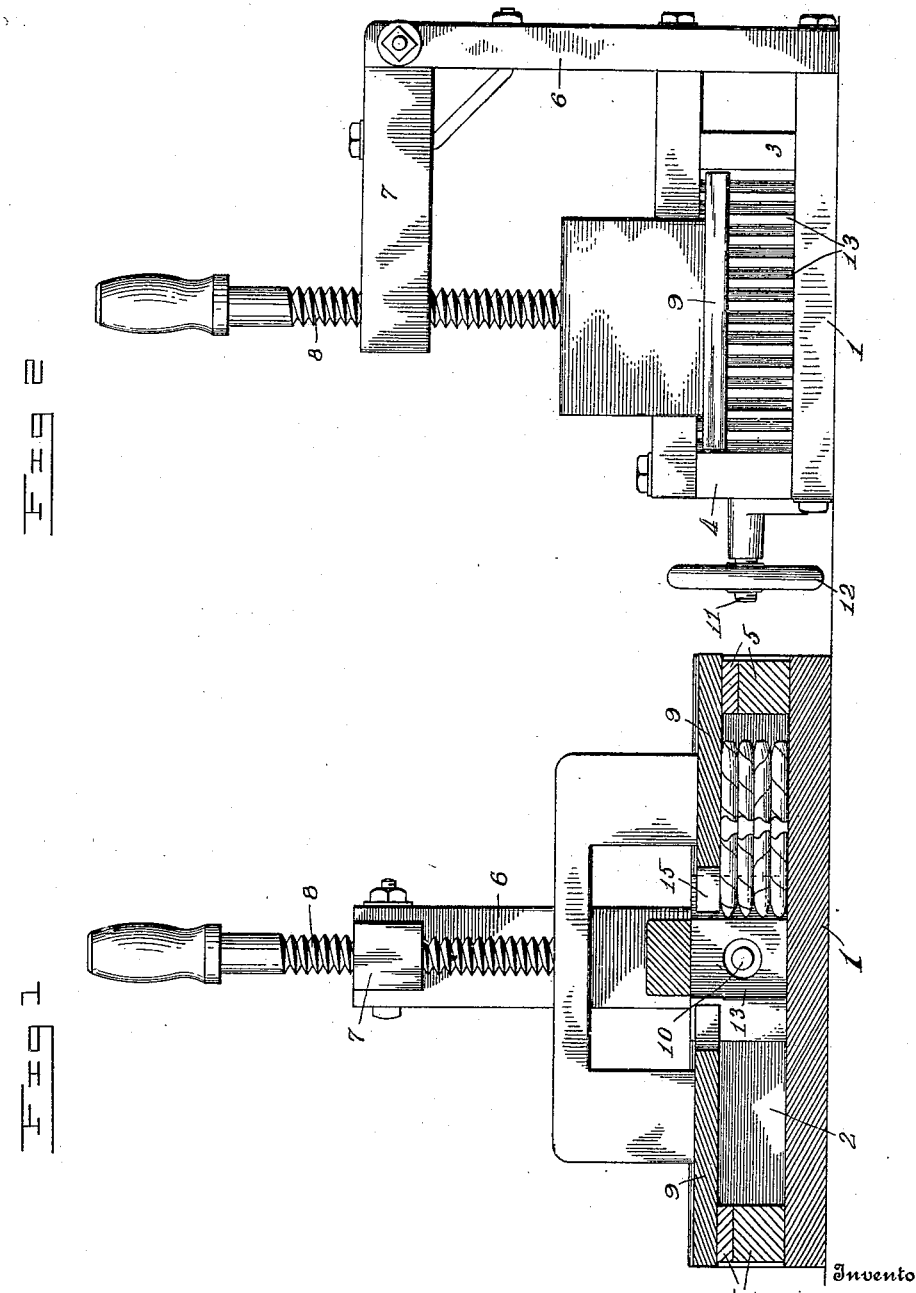
Witnesses
H. C. Tohuette
G. M. Stickles
Inventor
Nathan Weiss
By Meyers, Cushman & Rea
Attorneys N. WEISS.
CIGAR PRESS.
APPLICATION FILED SEPT. 1, 1908.
910,977.
Patented Jan. 26, 1909.
3 SHEETS—SHEET 2.
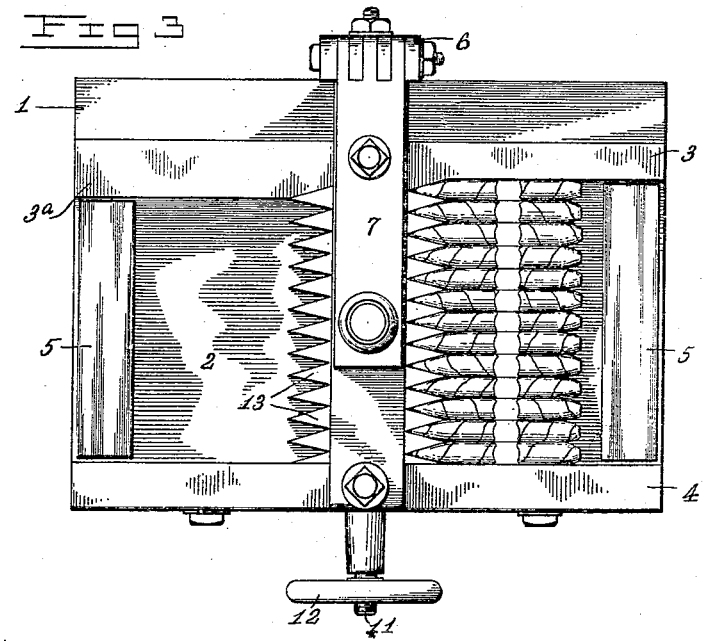
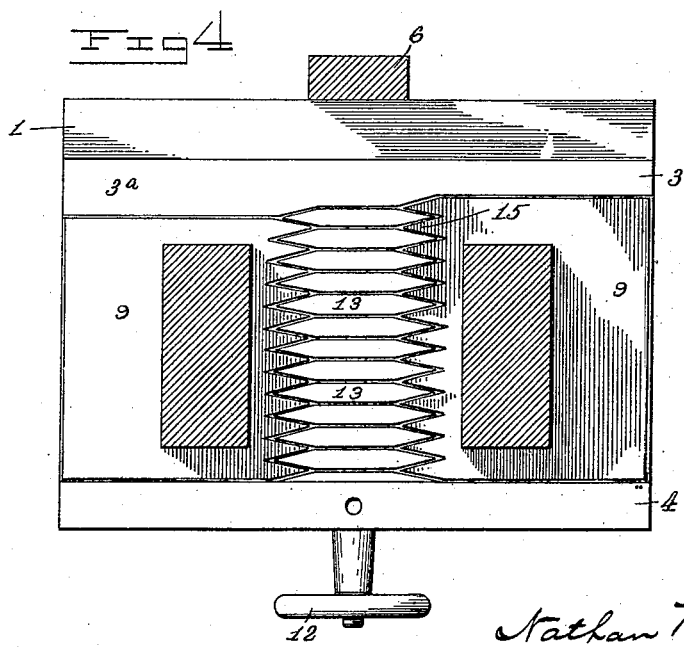
Witnesses
Inventor
Nathan Weiss
By Meyers, Cushman & Rea
Attorneys N. WEISS.
CIGAR PRESS.
APPLICATION FILED SEPT. 1, 1908.
910,977.
Patented Jan. 26, 1909.
3 SHEETS—SHEET 3.
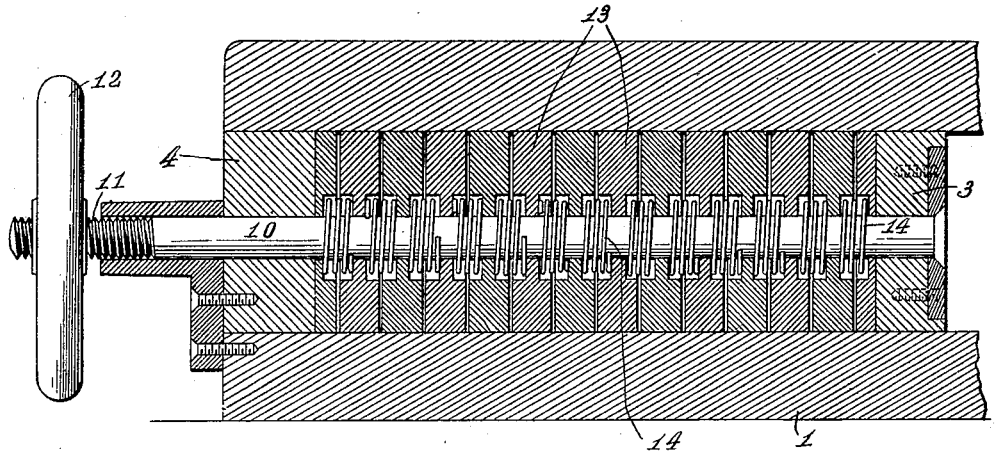
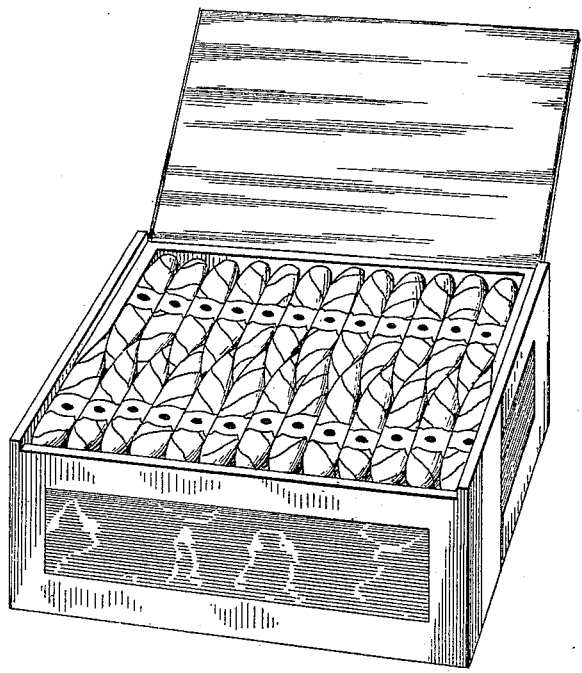

UNITED STATES PATENT OFFICE.

NATHAN WEISS, OF NEW YORK, N. Y., ASSIGNOR TO AMERICAN CIGAR COMPANY, OF NEW YORK, N. Y., A CORPORATION OF NEW JERSEY.

CIGAR-PRESS.

No. 910,977.      Specification of Letters Patent.      Patented Jan. 26, 1909.

Application filed September 1, 1908. Serial No. 451,187.

*To all whom it may concern:*

Be it known that I, NATHAN WEISS, a citizen of the United States, residing at New York, in the county of New York and State of New York, have invented new and useful Improvements in Cigar-Presses, of which the following is a specification.

This invention relates to improvements in cigar-presses designed to receive a number of cigars intended to be placed in a cigar-box, for the purpose of compressing the mass of cigars to the shape and size of the box to be filled thereby, and in which press, after the mass of cigars are so pressed, they are allowed to remain until they become set, so that they may with facility be disposed in the cigar box and fill the same.

The invention has for its object to provide a press for this general purpose of novel and simple construction and operation, and primarily and broadly to provide such a press possessing means whereby the heads or mouth-ends of the cigars are shaped.

That which is new will be set forth in the claims appended to the description.

In the accompanying drawing illustrating the preferred embodiment of the invention, Figure 1 is a cross-sectional view illustrating a column of cigars arranged in the press chamber. Fig. 2 an end view looking into the open end of the press-chamber. Fig. 3 is a top plan view of the press, the presser-platen being removed to expose the interior of the press-chamber. Fig. 4 is a similar view of the presser-platen arranged in place and the superstructure removed. Fig. 5 a cross-sectional detail taken through the sectional cigar-head shaper. Fig. 6 a perspective view of a box of cigars which have been subjected to the action of the duplex press illustrated in the drawings, and Fig. 7 a detail of one of the cigars.

In the said drawing, and referring particularly to Figs. 1 and 2, the reference numeral 1 designates the bed or floor of the press-chamber 2; 3 and 4 side walls thereof one of which at least, as 4, is movable. The ends of the press-chamber are open and designed to receive adjustable and removable gage-blocks 5. A support 6 having an over-hanging arm 7 rises from the bed and arranged in and working through a screw-threaded opening in the arm is a screw 8 provided with a handle by which it may be manipulated, and carrying a presser-platen 9.

This is a very simple means of supporting and operating the presser-platen, but except where such means are specifically recited in the claims it is to be understood, of course, the invention is not restricted thereto.

As above stated, the invention is shown embodied in a press having a duplex press-chamber and accordingly the platen is a duplex one. The movable side wall of the press-chamber is connected to a rod 10, provided with a screw-threaded end 11, upon which is fitted an operating handle or wheel 12, as best shown in Fig. 5.

As thus far described the invention presents a cigar press in the chamber or chambers of which a number of cigars appropriate to fill a box may be assembled and in which they may be pressed so that the mass of cigars will assume a shape and size according to the interior of the box in which they are to be subsequently arranged, and wherein they may be allowed to remain until they become set. This press, as thus described, is composed of few and simple parts and yet is a very efficient press and one which is capable of compressing cigars of different length, the gage-blocks being freely adjustable to engage the tip ends of the cigars, irrespective of the length of the latter, within the dimensions of the press-chamber, and the movable wall of the press-chamber being capable of adjustment to comfortably receive a greater or lesser number of columns of cigars, or columns of cigars of various thickness, after which it may be adjusted by manipulating the handle or wheel 12 or other operating means to exert the requisite lateral compression upon the mass or bunch of cigars; and likewise the presser-platen which exerts vertical pressure upon the cigars is movable so that a greater or lesser number of cigars may be arranged in columns, or cigars of various thickness may be arranged in columns, and the platen then moved to exert the requisite degree of vertical pressure thereon.

In the complement of the machine gage blocks of various lengths and height may be employed according to the depth and width of the cigar boxes into which the cigars are to be packed, and a plurality of gage-blocks may be utilized where desirable and as shown in Fig. 1 of the drawing.

As stated, the primary and more important object of the invention is to provide a cigar press comprising means whereby the heads or mouth-ends of the cigars may be shaped as and when the mass of cigars are being pressed to box-size. A preferable means for accomplishing this result is shown in the drawing and consists of a compressible cigar-head shaper, the capacity of compression being secured in the preferred form of the invention by constructing the head-shaper of a number of separate sections 13, threaded upon a rod, the rod 10 preferably being used for this purpose, and the movable wall of the press-chamber being employed as the medium through which compression is imparted to the shaper. The active portions of the head shaper are fashioned to impart the desired shape to the heads of the cigars. In the example illustrated the shape of the cigar head is illustrated in Fig. 7 and accordingly the active portions of the shaper are the counterpart of that of the head of the cigar shown. It is preferred, also, that after the cigars in the press have become set and are to be removed therefrom, that the head-shaper may disengage the heads of the cigars so that the mass of cigars may readily be removed from the press-chamber, and when the shaper is of the specific type shown this is accomplished by interposing between the several sections thereof suitable springs 14, which when the pressure of the movable wall of the press-chamber is released throw the sections apart.

When it is desired that vertical pressure shall be exerted upon the heads of the cigars as well as upon the bodies thereof, the edge of the presser-platen adjacent the active ends of the shaper is toothed, as best shown at 15, Fig. 4, the teeth fitting the spaces between the active portions of the shaper, so that the head ends of the cigars may be subjected to vertical pressure and yet the platen allowed to move down upon the mass of cigars to any degree required.

The press shown as an example is designed to have assembled therein 100 cigars in columns of four cigars each, and for the purpose of assembling the cigars in attractive and nested manner illustrated in Fig. 6 the press-chamber is a duplex one, properly proportioned to receive thirteen columns of cigars on one side of the head presser and twelve columns on the opposite side, and that the pressure on each mass of cigars in the chamber may be equal the movable wall of the press is thickened out opposite that portion of the chamber in which twelve rows of cigars are disposed, as best shown at 3ᵃ Figs. 3 and 4.

In practice, if desired, a tape may be laid across the bed and against the walls of the press with its ends free so that after the compression has taken place the tape may be tied about the bundle and it may be removed *en masse* from the press-chamber.

The cigars will be assembled in column form, as shown, in the press-chamber with the heads disposed in the illustrated relation to the head-shaper, as many cigars being arranged in the several columns as may be desired according to the depth of the box in which they are to be packed. The gages 5 are then moved into contact with the tip ends of the cigars, the ends of the gages serving to limit inward or compression movement of the movable wall of the press-chamber. Preferably the presser-platen is caused to operate in advance of the lateral compression mechanism. Manipulation of the screw 8 causes the presser-platen to descend and exert a degree of vertical pressure on the mass of cigars determined by the depth of the gage employed, then the operating handle or wheel 12 is manipulated causing the movable wall to exert lateral pressure on the mass of cigars and the head-shaper to be compressed, the active face thereof engaging and shaping the heads of the cigars, the degree of this compression being governed by the length of the gages. The cigars are allowed to remain in the press chamber until they become set to the size and shape imparted thereto. The compression may then be released and the cigars removed and packed in a cigar box. When a tape or band is employed the entire mass may be removed as one. The press is particularly desirable where boxes are to be packed in an attractive nested manner, illustrated in Fig. 6 of the drawing, in which case, as before stated, the press-chamber is a duplex one.

Having thus described the invention, what is claimed is:

1. In a cigar press, the combination of a bed having walls, one of which is movable, forming an adjustable open-ended press-chamber, a presser-platen movable with relation to said chamber; means for operating the said movable wall and presser platen, and gages closing and movably arranged in the open ends of the press-chamber.

2. A cigar-packing press having a press-chamber adapted to receive a mass of cigars and provided with a cigar-head shaper of sufficient capacity to shape the heads of the mass of cigars, and means for exerting compression upon the mass of cigars.

3. A cigar packing press having a press-chamber adapted to receive a mass of cigars and provided with a compressible cigar-head shaper of sufficient capacity to shape the heads of the mass of cigars, and means for exerting compression upon the mass of cigars.

4. A cigar-packing press having a press-chamber to receive a mass of cigars and provided with a cigar-head shaper of sufficient capacity to shape the heads of the mass of cigars and composed of a number of sections, and means for exerting compression upon the mass of cigars.

5. A cigar-packing press having a press-chamber adapted to receive a mass of cigars and provided with a cigar-head shaper of sufficient capacity to shape the heads of the mass of cigars and composed of a number of independent sections, and means for exerting compression upon the mass of cigars.

6. A cigar-packing press having a press-chamber adapted to receive a mass of cigars and provided with a cigar-head shaper of sufficient capacity to shape the heads of the mass of cigars and composed of a number of independent sections, means for separating said sections to release the cigar-heads after compression, and means for exerting compression upon the mass of cigars.

7. In a cigar-press the combination with a press-chamber having a movable wall, of a compressible cigar head shaper, means for operating the movable wall and cigar-head shaper, and a presser-platen.

8. In a cigar-press the combination with a press-chamber a compressible cigar-head shaper arranged therein, said chamber having a movable side wall in engagement with the cigar head shaper, and means for operating the movable wall to exert pressure on said shaper.

9. In a cigar press the combination with a press bed having walls, one of which is movable, forming a press-chamber, a rod connected with the movable wall, and means for engaging the rod for operating the movable wall, a cigar-head shaper consisting of a number of independent sections strung on said rod, a frame rising from the bed, and a presser-platen adjustable in said frame with relation to the press-chamber.

10. A cigar packing press having a chamber adapted to receive a mass of cigars, a cigar head shaper of sufficient capacity to shape the heads of the mass of cigars, and means for operating the cigar head shaper.

In testimony whereof I have hereunto set my hand in presence of two subscribing witnesses.

NATHAN WEISS.

Witnesses:
F. N. De Rosset,
W. N. Morrison.